United States Patent [19]

Skaggs et al.

[11] Patent Number: 5,362,312
[45] Date of Patent: Nov. 8, 1994

[54] CARRIER FLUID FOR THE SUSPENSION AND DELIVERY OF WATER SOLUBLE POLYMERS

[75] Inventors: Bryan Skaggs, San Diego; Mike O'Brien, El Cajon, both of Calif.; James M. Seheult, Spring, Tex.; John M. Swazey, San Diego, Calif.

[73] Assignee: Merck & Co., Inc., Rahway, N.J.

[21] Appl. No.: 960,662

[22] Filed: Oct. 14, 1992

[51] Int. Cl.$^5$ ............... C09D 101/00; C09D 103/00; C09D 105/00
[52] U.S. Cl. ................. 106/189; 106/162; 106/197.2; 106/203; 106/208; 106/213
[58] Field of Search ........... 106/206, 208, 162, 163.1, 106/189, 197.2, 203, 208, 209, 213, 214

[56] References Cited

U.S. PATENT DOCUMENTS

| | | | |
|---|---|---|---|
| 4,269,974 | 5/1981 | Wintersdorff et al. | 536/114 |
| 4,312,675 | 1/1982 | Pickens et al. | 106/171 |
| 4,357,260 | 11/1982 | Sandford et al. | 106/209 |
| 4,363,669 | 12/1982 | Cottrell et al. | 106/205 |
| 4,425,241 | 1/1984 | Swanson | 507/110 |
| 4,453,979 | 6/1984 | Demasi et al. | 106/188 |
| 4,561,985 | 12/1985 | Glass, Jr. | 507/108 |
| 4,654,086 | 3/1987 | Baird et al. | 106/206 |
| 4,778,786 | 10/1988 | Reever et al. | 106/208 |
| 4,799,962 | 1/1989 | Ahmed | 106/208 |

FOREIGN PATENT DOCUMENTS

| | | | |
|---|---|---|---|
| 0281252 | 9/1988 | European Pat. Off. | 106/208 |
| 0500206 | 8/1992 | European Pat. Off. | 106/208 |

*Primary Examiner*—Anthony Green
*Attorney, Agent, or Firm*—Richard S. Parr; Melvin Winokur; Paul D. Matukatis

[57] ABSTRACT

A liquid carrier fluid that is used as a carrier system to suspend and deliver water soluble polymers which act to adjust the rheological properties of the aqueous systems to which they are added.

8 Claims, No Drawings

CARRIER FLUID FOR THE SUSPENSION AND DELIVERY OF WATER SOLUBLE POLYMERS

BACKGROUND OF THE INVENTION

This invention relates to liquid carrier fluids for water soluble polymers or gums. This invention also relates to a method for avoiding lump or "fisheye" formation when dry, hydrophilic polymers are added to aqueous systems. This invention also relates to enhancing secondary oil recovery without damaging or substantially reducing the permeability of the porous strata with which it comes into contact. Other aspects as well as the advantages of the disclosed invention will be apparent to those skilled in the art upon reading the following disclosure and claims.

Hydrophilic polymers or gums are widely used in industry. They are used to thicken, suspend or stabilize aqueous systems. These gums can produce gels or act as emulsion stabilizers, flocculents, binders, film formers, lubricants and friction reducers. In each of these applications, the polymers are used to adjust and control the rheological properties of the aqueous system to which they are being added.

For commercial and industrial applications, rapid addition of these gums to water is highly desirable. Doing so, however, often results in the formation of lumps of unhydrated polymer, commonly known as fisheyes. These lumps are gel-like substances, wet on the outside but dry on the inside, that form as a result of the polymer beginning to hydrate before the polymer molecules are dispersed. Once the outer layer of polymer is hydrated, the lump or fisheye often cannot be dispersed even with vigorous mixing. Removal of these lumps results in significant losses of time, material and polymer efficiency.

These lumps are particularly problematic in the oil and gas industry where water soluble polymers are used downhole during drilling, workover, completion, stimulation and reservoir flooding operations. These unhydrated lumps, inert to enzymes, chemical breakers and acids, cause a variety of problems including plugging of the well and permeability impairment of the oil bearing strata.

To avoid lump or fisheye formation and its associated problems, the polymers can be added to the aqueous systems as liquid slurries. A number of methods for accomplishing this, and the compositions prepared thereby, are described in the prior art. Unlike the present invention, they use oil carriers (e.g., mineral or diesel) to suspend and deliver the polymers to the aqueous systems. In addition to the oil carrier fluid, these slurries usually contain clay or clay like particulates which act to viscosify and stabilize the water in oil emulsion. The disadvantages of these carrier systems is that attempts to eliminate the oil, often an undesirable component, result in the substitution of oil by toxic glycol ether. The clay component itself is also oftentimes an undesirable component. This is particularly true in oil and gas field applications where incorporation of the clay into the slurries, which is necessary to keep the polymer in solution, impairs the permeability of the oil or gas bearing strata. This is the very problem caused by the formation of fisheyes that the oil slurry is supposed to eliminate.

U.S. Pat. No. 4,453,979 describes the use of water with a high molecular weight blend of water and polyethylene glycol to disperse hydrophilic gums. European Publication 58 017 describes the use of a water and clay based drilling fluid which contains high molecular weight PEG. PEG ranging in molecular weight from 1000 to 10,000,000, which are solid at room temperature, are mentioned.

The disadvantages of the oil based carders are overcome by the present invention by using a safe, nontoxic, water soluble carrier fluid. In addition to this, the present invention allows the addition of a polymer to aqueous systems with or without mixing that, in the case of a dry polymer, could result in lump or fisheye formation.

SUMMARY OF THE INVENTION

A polymeric fluid composition comprising:
a) 0.2–59%, preferably 0.2–49% one or more water soluble polysaccharides;
b) 40–98.8%, preferably 50–98.8% water soluble, polyethylene glycol or thickened polyethylene glycol, preferably having an average molecular weight between about 150 and about 600;
c) 1–6% one or more viscosified polyol fluid components; and
d) 0.1–10%, based on polyol weight, of one or more viscosifying polysaccharides.

The above mentioned percentages, and percentages mentioned below, unless otherwise indicated, are weight percentages based on the total fluid composition weight.

The appropriate amount of polysaccharide and polyethylene glycol suitable for a particular composition depends on desired composition viscosity and other physical properties, as well as polysaccharide identity and morphology (e.g. density). Compositions containing polysaccharides having low density are preferably formulated with large quantities of polyethylene glycol, and compositions containing polysaccharides having high density are preferably formulated with small quantities of polyethylene glycol. The water soluble polysaccharides are preferably selected from the group consisting of xanthan gum, algin, carrageenan, guar, carboxymethyl cellulose and polyanionic cellulose. The thickened polyethylene glycol preferably comprises between about 0.1–1.0%, based on the weight of polyethylene glycol, thickener selected from the group consisting of polyacrylic acid (e.g. Carbopol, BF Goodrich) and/or hydroxypropyl cellulose or their functional equivalents. The viscosified polyol fluid components are preferably selected from the group consisting of ethylene glycol or glycerin. The viscosifying polysaccharides are preferably selected from the group consisting of gellan gum, xanthan gum, rhamsan gum, welan gum or glycol-compatible welan gum, and iota, lambda or kappa sulfated polysaccharides.

In some instances, water may be added to the viscosified polyol in concentrations ranging from 0 to 40% by weight of the total carrier fluid.

The invention also discloses a process for suspending water soluble polysaccharides which comprises
a) adding a viscosifying polysaccharide to a viscosified polyol fluid component, and mixing through a shear pump;
b) raising the solution temperature to approximately 120° F.;
c) adding polyethylene glycol or thickened polyethylene glycol, preferably having an average molecular weight between about 150 and about 600;

d) raising the solution temperature to 190° F. and mixing until a homogeneous solution is obtained; and e) adding a water soluble polysaccharide to the homogeneous solution.

The water soluble polysaccharides are preferably selected from the group consisting of xanthan gum, algin, carrageenan, guar, carboxymethyl cellulose and polyanionic cellulose. The thickened polyethylene glycol preferably comprises between about 0.1–1.0% thickener selected from the group consisting of partially neutralized polyacrylic acid (e.g. Carbopol, BF Goodrich) and/or hydroxypropyl cellulose or their functional equivalents. The viscosified polyol fluid components are preferably selected from the group consisting of ethylene glycol or glycerin. The viscosifying polysaccharides are preferably selected from the group consisting of gellan gum, xanthan gum, rhamsan gum, welan gum or glycol-compatible welan gum, and iota, lambda or kappa sulfated polysaccharides.

In some instances, water may be added to the viscosified polyol in concentrations ranging from 0 to 40% by weight of the total carrier fluid.

Also disclosed is a method of enhancing secondary oil recovery from potentially producing reservoirs without damaging or impairing the porosity of the oil bearing strata with particulates which are commonly found in the compositions disclosed in the prior art.

DETAILED DESCRIPTION OF THE INVENTION

The present invention discloses polymeric fluid compositions as well as a processes for producing the same. The fluid of the invention advantageously does not require the presence of undesirable clay and hydrocarbon components, and does not result in the formation of the formation of lumps or fisheyes.

The use of low molecular weight polyethylene glycol is surprisingly effective for solubilizing certain water soluble polysaccharides. The compositions are surprising because when lower molecular weight PEG is blended with a material such as glycerin which is thickened with a viscosifier, a gel structure is formed. The PEG/glycerin/viscosifier structure is capable of suspending particles such as water soluble polymers that are insoluble in the PEG/polyol fluid for an indefinite period of time. As a result, suspensions of water soluble polymers can be shipped and stored for a extended periods of time. If desired, these compositions can be prepared with water as well, but it is not necessary to use water for preparing these fluids.

The compositions comprise a) water soluble polysaccharides, b) polyethylene glycol or thickened polyethylene glycol, preferably having an average molecular weight between about 150 and about 600, c) viscosified polyols, and d) viscosifying polysaccharides. If non-thickened polyethylene glycol is used, agitation is required to prevent partial settling of the water soluble polymers. Therefore, it is preferable, in many instances, to use thickened polyethylene glycol.

As used herein, the term water soluble polysaccharides refers to water dispersible or soluble hydrophilic polysaccharides preferably selected from the group consisting of xanthan gum, gellan gum, algin, carrageenan, guar, hydroxypropyl guar, cellulosics such as carboxymethyl cellulose and polyanionic cellulose, polyacrylamides, and starch.

As used herein the term "polyethylene glycol" refers to liquid and solid polymers of the general formula $H(OCH_2CH_2)_nOH$, where n is greater than or equal to 4.

As used herein the term viscosified polyol refers to viscosified polyol compounds having two or more —OH groups, preferably glycerin or ethylene glycol.

As used herein the term viscosifying polysaccharide refers to one or more polysaccharides selected from the group consisting of gellan gum, xanthan gum, rhamsan gum, welan gum or glycol-compatible welan gum, and iota, lambda or kappa sulfated polysaccharides.

The viscosified polyol component of the present invention comprises between about 1 and 6%. In certain instances water may be added to the polyol in concentrations ranging from 0 and 40% by weight of the total carrier fluid.

Preferably, the polymeric fluid compositions comprise:
a) 4.0–49% xanthan gum;
b) 50–95% water soluble, polyethylene glycol or thickened polyethylene glycol, preferably having an average molecular weight between about 150 and about 600;
c) 1–6% glycerin; and
d) 0.1–10% polyol weight, of one or more viscosifying polysaccharides selected from the group consisting of welan gum, glycol-compatible welan gum and rhamsan gum.

More preferably, the polymeric fluid compositions comprise:
a) 8.0–48%, more preferably 12–45%, xanthan gum;
b) 50–90%, more preferably 52–85% water soluble, polyethylene glycol or thickened polyethylene glycol, preferably having an average molecular weight between about 150 and about 600;
c) 2–5%, more preferably 3–5% glycerin; and
d) 0.5–5%, more preferably 1–3%, based on polyol weight, of one or more viscosifying polysaccharides selected from the group consisting of welan gum, glycol-compatible welan gum and rhamsan gum.

Within these preferred weight ranges, the specific amount of each component or the fluid composition is dependent on the end use to which the carrier fluid is put, i.e., on the flow properties needed by the individual worker in the field.

Preferred compositions for use as drilling fluids have the following weight ranges:
a) 20–48%, more preferably 35–46% xanthan gum;
b) 50–78%, more preferably 50–60% water soluble, polyethylene glycol or thickened polyethylene glycol, preferably having an average molecular weight between about 150 and about 600;
c) 2–4% glycerin; and
d) 0.8–2% polyol weight, of glycol-compatible welan gum.

Xanthan gum is an extracellularly produced gum made by the heteropolysaccharide-producing bacterium *Xanthomonas campestris* by whole culture fermentation of a medium comprising a fermentable carbohydrate, a nitrogen source and other appropriate nutrients. Examples of commercially available xanthan gum are XANVIS, KELTROL T, KELTROL F, KELZAN AR and KELZAN, available from Kelco Division of Merck & Co., Inc. Processes for producing xanthan gum are described in a number of patents, including U.S. Pat. Nos. 4,316,012, 4,352,882 and 4,375,512.

Welan gum is prepared according to the procedure described in U.S. Pat. No. 4,342,866. Glycol-compatible welan gum, described in European Publication 500206, is prepared according to a procedure whereby after fermentation and prior to precipitation, sodium or potassium sulfate is added to the broth which is also treated with sodium hypochlorite and calcium propionate, followed by precipitation, drying and milling. Welan gum and glycol-compatible welan gum are both biogums commercially available from Kelco Division of Merck & Co., Inc.

Rhamsan gum, also referred to as heteropolysaccharide S-194, is prepared according to the procedure described in U.S. Pat. No. 4,401,760. The patent describes Alcaligenes microorganism ATCC 31961 and processes for producing heteropolysaccharide S-194.

Generally, the fluid compositions are prepared by adding a viscosifying polysaccharide to a viscosified polyol fluid component. These components are mixed through a shear pump. Solution temperature is raised to approximately 120° F. and polyethylene glycol is added (PEG 300). Temperature of the solution is raised to 190° F. and mixing is continued for 1 hour or until a homogeneous solution is obtained. A water soluble polysaccharide is then added to the carrier fluid. The solution .to which the water soluble polysaccharide is added can be hot or cool.

The uses to which the polymeric fluid composition can be put include any application requiring the use of water soluble polymers. These applications include, but are not limited to uses in adhesives, ceramics, cleaners, polishers, detergents, explosives, ink, paint, paper and textiles. In addition to the above they are also used extensively in the agricultural, fire-fighting, metal-working, mining and oil field industries.

The following examples are intended to illustrate the invention and as such are not to be considered as limiting the invention as set forth in the claims appended hereto.

EXAMPLE 1

Glycol compatible welan gum, welan gum or rhamsan gum is added to glycerin. These components are mixed through a shear pump. Solution temperature is raised to approximately 120° F. and polyethylene glycol (PEG 300) is added. Temperature of the solution is raised to 190° F. and mixing is continued for 1 hour or until a homogeneous solution is obtained. XANVIS polymer is then added to the carrier fluid.

| Component (lbs) | 1a | 1b | 1c | 1d | 1e | 1f |
|---|---|---|---|---|---|---|
| PEG 300 | 272.3 | 466.4 | 283.5 | 263.5 | 272.3 | 466.4 |
| XANVIS | 211 | 5.0 | 211 | 211 | 211 | 5.0 |
| Glycerin | 16.3 | 28.0 | 5.3 | 25.25 | 16.3 | 28.0 |
| Glycol compatible welan gum | 0.4 | 0.6 | — | — | — | — |
| Rhamsan gum | — | — | 0.12 | 0.25 | — | — |
| Welan gum | — | — | — | — | 0.4 | 0.6 |

EXAMPLE 2

Glycol compatible welan gum, welan gum or rhamsan gum is added to glycerin. These components are mixed through a shear pump. Solution temperature is raised to approximately 120° F. and preheated polyethylene glycol, thickened with hydroxypropyl cellulose (PEG 300 hpc), is added. Temperature of the solution is raised to 190° F. and mixing is continued for 1 hour or until a homogeneous solution is obtained. XANVIS polymer is then added to the carrier fluid.

| Component (lbs) | 2a | 2b | 2c | 2d | 2e | 2f |
|---|---|---|---|---|---|---|
| PEG 300 hpc | 272.3 | 466.4 | 283.5 | 263.5 | 272.3 | 466.4 |
| XANVIS | 211 | 5.0 | 211 | 211 | 211 | 5.0 |
| Glycerin | 16.3 | 28.0 | 5.3 | 25.25 | 16.3 | 28.0 |
| Glycol compatible welan gum | 0.4 | 0.6 | — | — | — | — |
| Rhamsan gum | — | — | 0.12 | 0.25 | — | — |
| Welan gum | — | — | — | — | −0.4 | 0.6 |

EXAMPLE 3

Glycol compatible welan gum, welan gum or rhamsan gum is added to glycerin. These components are mixed through a shear pump. Solution temperature is raised to approximately 120° F. and preheated polyethylene glycol, thickened with polyacrylic acid (PEG 300 pa), is added. Temperature of the solution is raised to 190° F. and mixing is continued for 1 hour or until a homogeneous solution is obtained. XANVIS polymer is then added to the carrier fluid.

| Component (lbs) | 3a | 3b | 3c | 3d | 3e | 3f |
|---|---|---|---|---|---|---|
| PEG 300 pa | 272.3 | 466.4 | 283.5 | 263.5 | 272.3 | 466.4 |
| XANVIS | 211 | 5.0 | 211 | 211 | 211 | 5.0 |
| Glycerin | 16.3 | 28.0 | 5.3 | 25.25 | 16.3 | 28.0 |
| Glycol compatible welan gum | 0.4 | 0.6 | — | — | — | — |
| Rhamsan gum | — | — | 0.12 | 0.25 | — | — |
| Welan gum | — | — | — | — | 0.4 | 0.6 |

The compositions described in Examples 1, 2 and 3 are smooth, homogeneous fluids which can be formed by rapidly adding XANVIS.

EXAMPLE 4

According to the weight amounts indicated in Example 3a above, compositions of the invention are prepared by substituting algin, carboxymethyl cellulose, or guar gum for XANVIS water soluble polysaccharide. The compositions formed are smooth, homogeneous fluids which can be formed by rapidly adding the water soluble polysaccharide.

EXAMPLE 5

Hydroxypropyl cellulose is added to glycerin. These components are mixed through a shear pump. Solution temperature is raised to approximately 120° F. and polyethylene glycol (PEG 300) is added. Temperature of the solution is raised to 190° F. and mixing is continued for 1 hour or until a homogeneous solution is obtained. XANVIS polymer is then added to the carrier fluid.

| Component (lbs) | |
|---|---|
| PEG 300 | 284.4 |
| XANVIS | 211 |
| Glycerin | 4.3 |
| Hydroxypropyl cellulose | 0.3 |

The compositions formed are smooth, homogeneous fluids which can be formed by rapidly adding XANVIS.

EXAMPLE 6

A slurry formulation was prepared by first forming a master mix, combining the master mix with PEG-300, and then introducing XANVIS to the combination.

a) Master Mix: Glycol compatible welan gum was combined with glycerin and PEG-300 in the following weight amounts:

| Component | lbs |
| --- | --- |
| Glycol-compatible welan gum | 1.35 |
| Glycerin | 90.0 |
| PEG-300 | 60.0 |

The glycol-compatible welan gum amount is about 1.5% based on the weight of glycerin present.

Based on specific gravity of these additives, the final volume is about 15 gallons. The viscosity is about 170,000 cP at 180° F. (Brookfield DV-II equipped with a #4 cylindrical spindle at 0.3 rpm). Viscosity reading was taken after 5 minutes at the designated shear rate.

b) Master Mix+PEG-300: 151.35 lbs master mix was added to 1518 lbs PEG-300 and mixed thoroughly through shear devices to assure proper mixing of the two phases. Viscosity for the master mix/PEG-300 combination is >2,000 cP at 80° F. (Brookfield DV-II equipped with a #2 cylindrical spindle at 0.3 rpm).

c) XANVIS addition: 1200 lbs XANVIS was added to mix formed in step b). The slurry is pumped through a shear device for 10-15 minutes. Viscosity is >20,000 cP at 80° F. (Brookfield DV-II equipped with a #4 cylindrical spindle at 0.3 rpm). The final slurry has the following approximate weight ratio:

| Component | % |
| --- | --- |
| PEG-300 | 55 |
| XANVIS | 42 |
| Glycerin | 3 |

1.5% glycol-compatible welan gum, based on weight of glycerin, represents the amount of viscosifying polysaccharide.

EXAMPLE 7 (Control)

The following compositions were prepared according to procedures described in U.S. Pat. No. 4,312,675, whereby solvent is sheared, dispersing agents and suspending agents are added to the solvent, and polymer is slowly added.

| Ingredient | weight % 7a | weight % 7b |
| --- | --- | --- |
| Octyl alcohol | 24.60 | — |
| Methanol | 2.50 | — |
| Hydroxypropyl cellulose | 0.25 | — |
| Ethylene glycol monobutyl ether | 0.30 | 0.30 |
| Diesel No. 1 | 21.50 | — |
| Lecithin | 0.86 | 0.77 |
| Fine mesh xanthan gum | 50.00 | 50.00 |
| Diesel No. 1 or No. 2 | — | 47.93 |
| Organophilic clay | — | 1.00 |

These oil carrier fluid compositions contain toxic components which have low flash points and which are unsafe for many industrial purposes.

EXAMPLE 8 (Control)

Fine mesh xanthan gum is introduced into water at a concentration of about 0.1%, and the mixture is heated.

EXAMPLE 9 (Control)

Fine mesh xanthan gum is introduced into water at a concentration of about 1.0%, and the mixture is heated.

Control compositions require slow polysaccharide addition, and contain undesirable gel lumps which make them unsuitable for many industrial purposes. Fluid compositions of the present invention are superior to the fluid compositions of water and xanthan gum, and safer than fluid compositions described in the prior art.

What is claimed is:

1. A polymeric fluid composition comprising:
   a) 0.2-49% one or more water soluble polysaccharides selected from the group consisting of xanthan gum, algin, carrageenan, guar, carboxymethyl cellulose, polyanionic cellulose and starch;
   b) 50-98.8% water soluble, polyethylene glycol or thickened polyethylene glycol having an average molecular weight between about 150 and about 600;
   c) 1-6% one or more viscosified polyol fluid components selected from the group consisting of ethylene glycol and glycerin; and
   d) 0.1-10%, based on polyol weight, of one or more viscosifying polysaccharides selected from the group consisting of gellan gum, xanthan gum, rhamsan gum, welan gum and iota, lambda and kappa sulfated polysaccharides.

2. A fluid composition of claim 1 wherein the thickened polyethylene glycol comprises between about 0.1-1.0%, based on the weight of polyethylene glycol, thickener selected from the group consisting of polyacrylic acid and hydroxypropyl cellulose or their functional equivalents.

3. A polymeric fluid composition of claim 1 consisting essentially of:
   a) 4.0-49% xanthan gum;
   b) 50-95% water soluble, polyethylene glycol or thickened polyethylene glycol having an average molecular weight between about and about 600;
   c) 1-6% glycerin; and
   d) 0.1-10% polyol weight, of one or more viscosifying polysaccharides selected from the group consisting of welan gum and rhamsan gum.

4. A polymeric fluid composition of claim 3 comprising:
   a) 8.0-48% xanthan gum;
   b) 50-90% water soluble, polyethylene glycol or thickened polyethylene glycol having an average molecular weight between about and about 600;
   c) 2-5% glycerin; and
   d) 0.5-5%, based on polyol weight, of one or more viscosifying polysaccharides selected from the group consisting of welan gum and rhamsan gum.

5. A polymeric fluid composition of claim 4 comprising:
   a) 12–45%, xanthan gum;
   b) 52–85% water soluble, polyethylene glycol or thickened polyethylene glycol having an average molecular weight between about 0 and about 600;
   c) 3–5% glycerin; and
   d) 1–3%, based on polyol weight, of one or more viscosifying polysaccharides selected from the group consisting of welan gum and rhamsan gum.

6. A fluid composition of claim 1 wherein the thickened polyethylene glycol comprises between about 0.1–1.0%, based on the weight of polyethylene glycol, thickener selected from the group consisting of partially neutralized polyacrylic acid and hydroxypropyl cellulose or their functional equivalents.

7. A process for suspending water soluble polysaccharides which comprises:
   a) adding a viscosifying polysaccharide selected from the group consisting of gellan gum, xanthan gum, rhamsan gum, welan gum, and iota, lambda and kappa sulfated polysaccharides to a viscosified polyol fluid component selected from the group consisting of ethylene glycol and glycerin, and mixing through a shear pump, to form a solution;
   b) raising the solution temperature to approximately 120° F.;
   c) adding polyethylene glycol or thickened polyethylene glycol;
   d) raising the solution temperature to 190° F. and mixing until a homogeneous solution is obtained; and
   e) adding a water soluble polysaccharide to the homogeneous solution.

8. A process of claim 7 wherein the water soluble polysaccharides are selected from the group consisting of xanthan gum, algin, carrageenan, guar, carboxymethyl cellulose, polyanionic cellulose and starch.

* * * * *